US009416301B2

(12) United States Patent
Zhou et al.

(10) Patent No.: US 9,416,301 B2
(45) Date of Patent: Aug. 16, 2016

(54) ULTRAFAST DUAL CURE ADHESIVE USEFUL FOR BONDING TO GLASS

(71) Applicant: DOW GLOBAL TECHNOLOGIES LLC, Midland, MI (US)

(72) Inventors: Lirong Zhou, Rochester, MI (US); Gary L. Jialanella, Oxford, MI (US); Andreas Lutz, Galgenen (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/437,285

(22) PCT Filed: Mar. 13, 2013

(86) PCT No.: PCT/US2013/030734
§ 371 (c)(1),
(2) Date: Apr. 21, 2015

(87) PCT Pub. No.: WO2014/074140
PCT Pub. Date: May 15, 2014

(65) Prior Publication Data
US 2015/0267093 A1    Sep. 24, 2015

Related U.S. Application Data

(60) Provisional application No. 61/723,847, filed on Nov. 8, 2012.

(51) Int. Cl.
*C09J 175/14*    (2006.01)
*C09J 7/02*    (2006.01)
(Continued)

(52) U.S. Cl.
CPC ............ *C09J 175/14* (2013.01); *C08F 290/067* (2013.01); *C08G 18/12* (2013.01);
(Continued)

(58) Field of Classification Search
CPC .............................. C09J 175/14; C09J 7/0246
USPC ........................................................ 156/331.4
See application file for complete search history.

(56) References Cited

U.S. PATENT DOCUMENTS 3,525,726 A    8/1970    Galinke et al.
3,707,521 A    12/1972    De Santis
(Continued)

FOREIGN PATENT DOCUMENTS

CA        772229 A    11/1967
DE    19924139 A1    11/2000
(Continued)

OTHER PUBLICATIONS

Kohler et al., *An Apparatus for Determining Both the Quantity of Gas Evolved and the Amount of Reagent Consumed in Reactions with Methyl Magnesium, Iodide*, 49 Journal of the American Chemical Society 3181, 3181-88 Dec. 10, 1927.

*Primary Examiner* — Daniel Lee
(74) *Attorney, Agent, or Firm* — The Dobrusin Law Firm, P.C.

(57) ABSTRACT

A composition comprising: a) one or more isocyanate functional components; b) one or more compounds containing a cycloaliphatic tertiary amine: c) one or more low functional acrylate containing components having about 1 to 4 acrylate groups per molecule; d) one or more high functional acrylate containing components having 5 to about 10 acrylate groups per molecule; and e) one or more compounds containing a peroxide group; wherein the composition is a two component composition and components a) and b) are kept separate from component e) until cure is desired. The composition may be utilized as an adhesive.

20 Claims, 1 Drawing Sheet

(51) Int. Cl.

| | |
|---|---|
| *C08G 18/48* | (2006.01) |
| *C08G 18/63* | (2006.01) |
| *C08J 3/24* | (2006.01) |
| *C08F 290/06* | (2006.01) |
| *C08G 18/12* | (2006.01) |
| *C08G 18/20* | (2006.01) |
| *C09J 4/06* | (2006.01) |
| *C09J 175/16* | (2006.01) |

(52) U.S. Cl.
CPC ........ *C08G18/2081* (2013.01); *C08G 18/4841* (2013.01); *C08G 18/632* (2013.01); *C08J 3/243* (2013.01); *C09J 4/06* (2013.01); *C09J 7/0246* (2013.01); *C09J 175/16* (2013.01); *C08J 2375/16* (2013.01)

(56) References Cited

U.S. PATENT DOCUMENTS

| | | | |
|---|---|---|---|
| 3,779,794 | A | 12/1973 | De Santis |
| 4,345,053 | A | 8/1982 | Rizk et al. |
| 4,374,237 | A | 2/1983 | Berger et al. |
| 4,525,511 | A | 6/1985 | Kirby et al. |
| 4,538,920 | A | 9/1985 | Drake |
| 4,625,012 | A | 11/1986 | Rizk et al. |
| 4,687,533 | A | 8/1987 | Rizk et al. |
| 4,780,520 | A | 10/1988 | Rizk et al. |
| 5,063,269 | A | 11/1991 | Hung |
| 5,082,147 | A | 1/1992 | Jacobs |
| 5,115,086 | A | 5/1992 | Hsieh |
| 5,238,993 | A | 8/1993 | Hsieh |
| 5,304,612 | A | 4/1994 | Umetani et al. |
| 5,338,800 | A | 8/1994 | Umetani et al. |
| 5,410,051 | A | 4/1995 | Forgione |
| 5,466,727 | A | 11/1995 | Hsieh |
| 5,468,317 | A | 11/1995 | Hsieh |
| 5,603,798 | A | 2/1997 | Bhat |
| 5,623,044 | A | 4/1997 | Chiao |
| 5,792,811 | A | 8/1998 | Bhat |
| 5,852,103 | A | 12/1998 | Bhat |
| 5,852,137 | A | 12/1998 | Hsieh et al. |
| 5,922,809 | A | 7/1999 | Bhat et al. |
| 5,976,305 | A | 11/1999 | Bhat et al. |
| 6,015,475 | A | 1/2000 | Hsieh et al. |
| 6,053,971 | A | 4/2000 | Lin |
| 6,423,810 | B1 | 7/2002 | Huang et al. |
| 6,512,033 | B1 | 1/2003 | Wu |
| 6,512,039 | B1 | 1/2003 | Mowrey |
| 6,559,257 | B2 | 5/2003 | Quarmby |
| 6,562,881 | B2 | 5/2003 | Jacobine et al. |
| 6,596,787 | B1 | 7/2003 | Levandoski et al. |
| 6,673,875 | B2 | 1/2004 | Attarwala et al. |
| 6,706,831 | B2 | 3/2004 | Sonnenschein et al. |
| 6,709,539 | B2 | 3/2004 | Zhou |
| 6,852,801 | B1 | 2/2005 | Briggs et al. |
| 7,025,751 | B2 | 4/2006 | Silva et al. |
| 7,025,851 | B2 | 4/2006 | Caster et al. |
| 7,098,279 | B2 | 8/2006 | Maandi et al. |
| 7,101,950 | B2 | 9/2006 | Zhou et al. |
| 7,361,292 | B2 | 4/2008 | Zhou |
| 7,408,012 | B1 | 8/2008 | Kneafsey et al. |
| 7,416,599 | B2 | 8/2008 | Hsieh et al. |
| 7,534,843 | B2 | 5/2009 | Jialanella et al. |
| 7,737,241 | B2 | 6/2010 | Feng et al. |
| 9,045,672 | B2 * | 6/2015 | Jialanella ........... C08G 18/2081 |
| 2002/0016226 | A1 | 2/2002 | Jin et al. |
| 2002/0100550 | A1 | 8/2002 | Mahdi et al. |
| 2004/0214912 | A1 * | 10/2004 | Rink .................. C08G 18/6254 522/126 |
| 2005/0126683 | A1 | 6/2005 | Hsieh et al. |
| 2006/0124225 | A1 | 6/2006 | Wu et al. |
| 2007/0142556 | A1 | 6/2007 | Osae et al. |
| 2007/0155899 | A1 | 7/2007 | Briggs et al. |
| 2008/0177004 | A1 | 7/2008 | Osae et al. |
| 2009/0098388 | A1 | 4/2009 | Harvey et al. |
| 2012/0034870 | A9 | 2/2012 | Desai et al. |
| 2012/0279654 | A1 | 11/2012 | Jialanella et al. |
| 2014/0014268 | A1 | 1/2014 | Zhou et al. |

FOREIGN PATENT DOCUMENTS

| | | |
|---|---|---|
| EP | 0603046 A1 | 6/1994 |
| EP | 0964012 A1 | 12/1999 |
| EP | 1260548 A1 | 11/2002 |
| EP | 1524282 A1 | 4/2005 |
| EP | 1557455 A1 | 7/2005 |
| GB | 1122128 A | 7/1968 |
| JP | 1982-151612 A | 9/1982 |
| JP | 1993-0543650 A | 2/1993 |
| JP | 1993-239172 A | 9/1993 |
| JP | 2000-044920 A | 2/2000 |
| JP | 2010-529218 A | 8/2010 |
| JP | 2014-511931 A | 5/2014 |
| WO | 02/44295 A | 6/2002 |
| WO | 03/040248 A2 | 5/2003 |
| WO | 2006/038999 A1 | 4/2006 |
| WO | 2008/153673 A1 | 12/2008 |
| WO | 2010/030519 A1 | 3/2010 |
| WO | 2012/151086 A1 | 10/2012 |

* cited by examiner

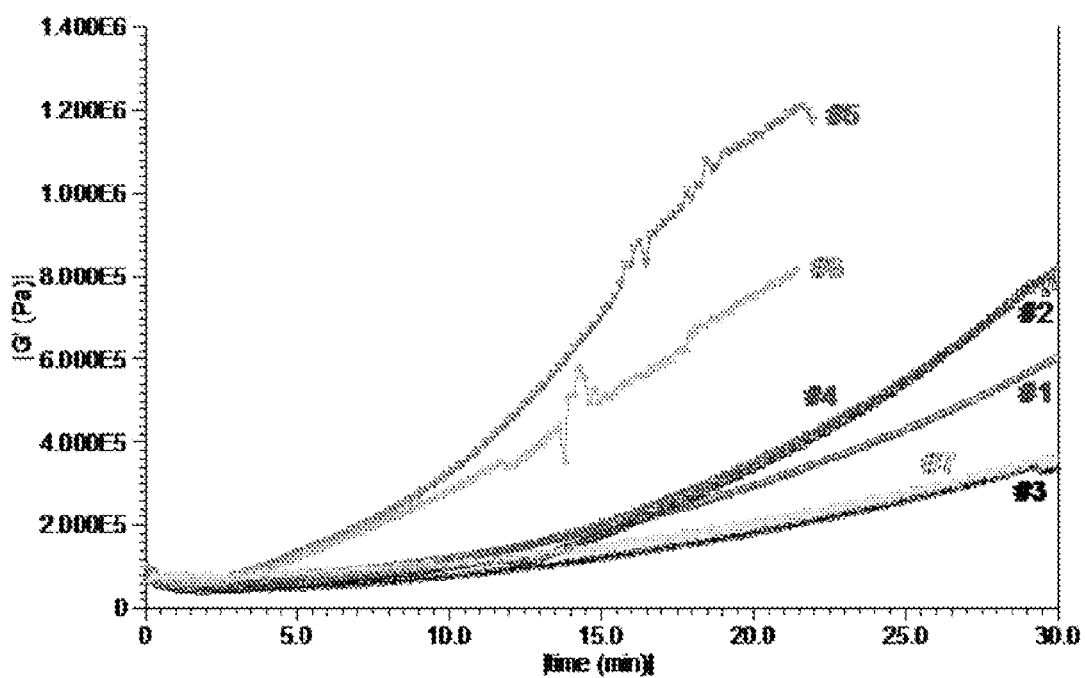

ULTRAFAST DUAL CURE ADHESIVE USEFUL FOR BONDING TO GLASS

FIELD OF THE INVENTION

The invention relates to an ultrafast system for bonding two substrates together comprising one or more isocyanate functional prepolymers and one or more of (meth)acrylate containing components and a cure acceleration system. The invention also comprises a method of using such systems for bonding substrates together.

BACKGROUND OF THE INVENTION

Compositions having isocyanate functional components are utilized to bond substrates together, such as, glass, often in the form of windows, into structures. In automotive assembly plants windows are bonded in with one part adhesive compositions containing isocyanate functional components, which cure by reaction with ambient moisture, and take several hours or days to cure. In the assembly plants, vehicles are not driven for several hours and this is acceptable. One part moisture curing adhesives known in the art are disclosed in U.S. Pat. Nos. 4,374,237; 4,687,533; 4,780,520; 5,063,269; 5,623,044; 5,603,798; 5,852,137; 5,922,809; 5,976,305; 5,852,137 and 6,512,033, relevant portions incorporated herein by reference.

Two-part compositions containing isocyanate functional prepolymers in one part and compounds having isocyanate reactive components in the other part are used where cure speed is important, such as in the automotive aftermarket replacement glass business. Customers desire that the adhesives cure quickly so that the vehicle can be driven as soon as possible after replacing the window. Examples of two-part compositions containing isocyanate functional prepolymers in one part and compounds having isocyanate reactive components in the other part are disclosed in EP 1,524,282, U.S. Pat. Nos. 5,852,103; 6,709,539; 7,101,950 and 7,361.292, relevant parts incorporated herein by reference. For certain applications even two part compositions containing isocyanate functional prepolymers do not cure fast enough for certain applications or customers. One solution is provided by commonly owned patent application titled DUAL CURE ADHESIVE USEFUL FOR BONDING TO GLASS, Jialanella U.S. patent application Ser. No. 13/455,294 filed Apr. 25, 2012, disclosing a composition comprising: a) one or more isocyanate functional prepolymers; b) one or more compounds containing a cycloaliphatic tertiary amine; c) one or more compounds containing a peroxide group; and d) and an acrylate containing component; and, one or more compounds containing one or more acrylate groups; wherein component a) and b) are kept separate from component c) until cure is desired. The cured compositions preferably demonstrate an adhesive strength as measured by lap shear strength according to SAE J1529 of 0.5 MPa or greater after 30 minutes from composition application or 0.25 MPa or greater after 15 minutes from adhesive application. The compositions are useful for bonding glass to other substrates, such as vehicles and buildings and parts of modular components together, such as vehicle modular components, relevant parts incorporated herein by reference.

Adhesive systems that allow for modification of properties to fit the environment of use or the substrates bonded are desired, such as relative elasticity and modulus. Manufacturers desire to handle products as soon as possible to enhance productivity. In modern industrial processes, there is a need to move parts and to place loads on adhesive systems as soon as possible. Adhesives which have a good green strength shortly after application and exhibit longer open time are needed. Open time is the time from contacting the two parts of a composition together until the composition can no longer adhere to a substrate. Open time is important because some time is needed to assemble the parts to be bonded together in the proper arrangement, sometimes the parts need to be adjusted after assembly to achieve the desired arrangement.

Even with the advancements in the art described herein there is a need for even faster curing systems that afford reasonable open times. Thus, what are needed are adhesive systems which exhibit good green strength, even more rapid cure rates, the ability to allow substrates to be handled shortly after application of the adhesive system and sufficient open times to allow proper placement of the parts bonded together. What are also needed are adhesive systems wherein the properties can be adjusted to meet the needs of a particular substrate system.

SUMMARY OF THE INVENTION

The present invention is a composition comprising: a) one or more isocyanate functional components; b) one or more compounds containing a cycloaliphatic tertiary amine; c) one or more low functional acrylate containing components having about 1 to 4 acrylate groups per molecule; d) one or more high functional acrylate containing components having 5 to about 10 acrylate groups per molecule; and, e) one or more compounds containing a peroxide group; wherein the composition is a two component composition and components a) and b) are kept separate from component e) until cure is desired. Preferably the low functional acrylate containing component comprises one or more of: one or more compounds containing one or more acrylate groups; one or more isocyanate functional components, prepolymers, containing free acrylate groups; or one or more adducts of a polyisocyanate and a compound containing one or more acrylate groups and one or more active hydrogen containing groups.

In some embodiments, the invention is a composition comprising: a) one or more isocyanate functional prepolymers further containing about 1 to 4 acrylate groups per molecule; b) one or more compounds containing a cycloaliphatic tertiary amine; c) one or more compounds containing a peroxide group; and, d) one or more high functional acrylate containing components having 5 to about 10 acrylate groups per molecule; wherein the composition is a two component composition and components a) and b) are kept separate from component c) until cure is desired. In one preferred embodiment the composition may comprise one or more isocyanate functional prepolymers further containing about 1 to 4 acrylate groups per molecule and one or more isocyanate functional prepolymers which do not contain acrylate groups.

In another embodiment, the invention is a method comprising: i) contacting the two parts of a composition of this invention; ii) contacting the contacted parts of the composition of the invention with one or both of a first substrate and/or a second substrate; iii) contacting the first substrate and the second substrate with the contacted composition disposed between the two substrates; iv) allowing the composition of the invention to cure and bond the two substrates together. Preferably, the two parts of the composition contacted in step i) are mixed prior to contacting the composition with a substrate.

The compositions and methods of the invention allow substrates to be adhered together rapidly. This allows the bonded substrates to be handled or used after short curing times. The compositions properties can be adjusted to fit the requirements of the systems bonded together. The cured compositions preferably exhibit at least 50 percent of their final cured strength by 15 minutes from contacting the two parts and 100 percent of the final cured strength by 24 hours from contacting the two parts. The compositions preferably demonstrate an adhesive strength as measured by Shore A hardness of 5 or greater after 15 minutes from contacting the two parts, more preferably 7 or greater. The compositions preferably demonstrate an adhesive strength as measured by Shore A hardness of 75 or greater after 24 hours from contacting the two parts, more preferably 80 or greater. The compositions are useful as adhesives to bond substrates together and may be used to bond similar and dissimilar substrates together, for instance, plastics, glass, wood, ceramics, metal, coated substrates and the like. The compositions are especially useful for bonding glass to other substrates, such as vehicles and buildings and parts of modular components together, such as vehicle modular components. The glass can be bonded to coated and uncoated portions of vehicles. In one embodiment the composition bonds well to window flanges having cured residual polyurethane or siloxy functional polyolefins or polyethers disposed thereon. Preferably the compositions exhibit an open time of about 8 to 14 minutes and more preferably about 10 to about 14 minutes. The composition are especially useful for replacing windows in vehicles.

DESCRIPTION OF THE DRAWINGS

FIG. 1 is a graph of cure rate of compositions versus time after mixing of the two parts of the compositions based on the examples.

DETAILED DESCRIPTION

The claims are hereby incorporated by reference into this written description. All references cited herein are incorporated herein by reference in their entirety. This application claims priority from U.S. provisional application Ser. No. 61/723,847, filed Nov. 8, 2012 incorporated herein by reference in its entirety.

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw materials, incomplete conversion of the reactants and formation of by-products. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of this durability, the curable composition (e.g. adhesive) preferably exhibits excellent results during accelerated aging. Preferably this means that after a set of substrates bonded with the composition of the invention is exposed to heat aging, the failure mode in Quick Knife adhesion or Lap Shear testing is cohesive, meaning the adhesive breaks before the bond of the adhesive to the substrate breaks. Isocyanate content means the weight percent of isocyanate groups in the designated component. The isocyanate content can be measured by analytical techniques known to one skilled in the art, for example by potentiometric titration with an active hydrogen containing compound, such as dibutyl amine. The free acrylate content means the weight percent of acrylate groups available for reaction present in the designated component, such as the prepolymer, adduct of a polyisocyanate and one or more compounds containing one or more acrylate groups and one or more active hydrogen containing groups, and acrylate containing monomers, or in the composition, such as an adhesive. Residual content of a component refers to the amount of the component present in free form or reacted with another material, such as an adduct as described herein or a prepolymer. The residual content of a component can be calculated from the ingredients utilized to prepare the component or composition. Alternatively, it can be determined utilizing known analytical techniques. Heteroatom means nitrogen, oxygen, sulfur and phosphorus, more preferred heteroatoms include nitrogen and oxygen. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. The term isocyanate-reactive compound as used herein includes any organic compound having nominally at least two isocyanate-reactive groups. For the purposes of this invention, isocyanate-reactive groups, active hydrogen containing groups, refer to a group containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate-reactive groups, active hydrogen groups, are —COOH, —OH, —NH$_2$, —NH—, —CONH$_2$, —SH, and —CONH—. Preferable compounds containing isocyanate-reactive groups include polyols, polyamines, polymercaptans and polyacids.

The compositions of this invention can be any reactive system containing isocyanate functional components which are curable. Reactive means herein that the curable composition (e.g. adhesive) contains components which react to form a polymeric matrix that is set irreversibly once cured. The curable systems are two part systems. Preferably the curable systems are useful as adhesives.

The compositions of the invention may further comprise any one or more of the following features: the high functional acrylate component is present in sufficient amount such that the composition reaches at least 50 percent of its final strength by 15 minutes from contacting the two components; the high functional acrylate component is present in an amount of about 0.1 to about 5 percent by weight of the total weight of the composition; the high functional acrylate component has 5 to about 8 acrylate groups per molecule; the high functional acrylate component has 5 to about 6 acrylate groups per molecule; the weight ratio of one or more compounds containing a peroxide group to the one or more compounds containing a cycloaliphatic tertiary amine is from about 0.1:1.0 to about 50:1.0; one or more of isocyanate functional components comprise one or more isocyanate functional prepolymers further comprising one to four free acrylate groups, one or more adducts of a polyisocyanate and a compound containing one to four acrylate groups and one or more active hydrogen containing groups; the one or more compounds containing one to four acrylate groups may be a portion or all of the one or more isocyanate functional prepolymers containing free acrylate groups; the active hydrogen containing groups on the one or more compounds containing one to four acrylate groups and one or more active hydrogen containing groups are hydroxyl or amine groups; the one or more isocyanate containing prepolymers contain from about 0.1 to about 35 percent by weight of free isocyanate groups; the free acrylate content of the isocyanate functional prepolymers is about 1.0 to about 20 percent by weight; the composition contains from about 1 to about 30 percent by weight of one or more compounds or the residue of one or more compounds containing one or more acrylate groups; the composition contains from about 5 to about 30 percent by weight of one or more compounds or the residue of one or more compounds containing one or more acrylate groups; the composition contains from about 1 to about 60 percent by weight of free acrylate groups; the composition comprises, a) from about 10 to about 70 percent by weight of one or more isocyanate functional components, containing 1 to 4 acrylate groups, for example isocyanate functional prepolymers; b) from about 0.05 to about 20.0 percent by weight of one or more compounds containing a cycloaliphatic tertiary amine; c) from about 0.05 to about 5 percent by weight of one or more compounds containing a peroxide group; and d) from about from about 0.5 to about 2.5 percent by weight of one or more high functional acrylate containing components.

The methods of the invention may further comprise any one or more of the following features: a method comprising, i) contacting the two parts of the composition of the invention; ii) contacting the contacted composition of i) with a first substrate; iii) contacting the first substrate with a second substrate with the composition of i) disposed between the two substrates; iv) allowing the composition of i) to cure and bond the two substrates together, wherein the two parts a mixed prior to contacting with one or more substrates; the first substrate is glass or transparent plastic wherein the glass or transparent plastic may have an organic or ceramic enamel frit located about the periphery of the glass or transparent plastic; and the second substrate is plastic or metal which may be coated.

Isocyanate based (polyurethane or polyurea forming) curable systems comprise an isocyanate functional component. An isocyanate functional component contains one or more compounds having on average more than one isocyanate group per molecule. The isocyanate functional components can be any component which contains on average more than one isocyanate group (moiety). The isocyanate functional component can be in the form of an isocyanate functional prepolymer, a monomer or oligomer or an adduct of one or more monomer or oligomers having isocyanate groups and a compound containing isocyanate reactive groups (for example an amino or hydroxyl acrylate, having on average greater than 1 isocyanate group, and preferably 2 or more isocyanate groups. The isocyanate prepolymer can by any prepolymer prepared by reaction of one or more Isocyanate functional compounds with one or more compounds having on average more than one isocyanate reactive groups.

The curable system of the invention may be a two-part isocyanate functional component containing curable system. The two parts are reactive with one another and when contacted undergo a curing reaction. One part of the composition comprises, or contains, an isocyanate functional component. This is typically referred to as the resin side or A side. The other component of the composition comprises a peroxide, optionally acrylate containing components described herein, an isocyanate reactive component which comprises, or contains, one or more compounds, oligomers or prepolymers having on average more than one group reactive with isocyanate moieties as described herein, and adjuvants such as fillers, plasticizers and stabilizers. The second part is commonly known as the curative or B side. Compounds having on average one or more isocyanate reactive groups can be prepolymers, or can be small chain compounds, such as difunctional chain extenders or polyfunctional crosslinking agents. Typically, the chain extenders and crosslinking agents have a molecular weight of about 250 Daltons or less.

The reaction product is a cured product which is capable of bonding certain substrates together. In two part compositions, the a) one or more isocyanate functional components, optionally containing free acrylate groups; and b) one or more compounds containing a cycloaliphatic tertiary amine; are preferably kept separate from the e) one or more compounds containing a peroxide group. Preferably the a) one or more isocyanate functional components, optionally containing free acrylate groups; and b) one or more compounds containing a cycloaliphatic tertiary amine are located in the resin or A side. Preferably the e) one or more compounds containing one or more peroxide groups are located in the curative or B) side. Preferably the resin or A) side is packaged and stored in a moisture proof container prior to use to prevent undesirable curing of the prepolymer. The curative or B) side may is packaged in air, preferably dry air. The acrylate containing component, except for isocyanate functional prepolymers containing acrylate groups, may be located in either part, or both parts, of a two part composition and can be used to adjust the volume of the parts.

The one or more isocyanate functional components, preferably prepolymers, are present in sufficient quantity to provide cohesive strength, and in adhesive uses, adhesive character to the composition. Such isocyanate functional components, such as prepolymers, have an average isocyanate functionality sufficient to allow the preparation of a crosslinked polyurethane upon cure and not so high that the polymers are unstable. Prepolymers useful as isocyanate functional components are prepared by reacting one or more polyisocyanates with one or more compounds containing on average more than one isocyanate reactive group per molecule. The isocyanate functional components, prepolymers, preferably have a free isocyanate content which facilitates acceptable strength in the compositions prepared therefrom, preferably after 30 minutes, more preferably after 15 minutes. The isocyanate content in the isocyanate functional components is preferably about 1 percent by weight or greater based on the weight of the isocyanate functional components, more preferably about 2 percent by weight or greater, even more preferably about 6 percent or greater, even more preferably about 8 percent by weight or greater and most preferably about 10 percent by weight or greater. The isocyanate content in the isocyanate functional components is preferably about 35 percent by weight or less based on the weight of the isocyanate functional components, more preferably about 25 percent by weight or less, even more preferably about 20 percent by weight and most preferably about 15 percent by weight or less.

Isocyanate functional components may further comprise free acrylate groups. Free acrylate groups may be incorporated into the isocyanate functional components, such as prepolymers, by reacting a portion of terminal isocyanate groups with one or more compounds containing one or more active hydrogen containing groups and one or more acrylate groups. Alternatively, the acrylate groups can be incorporated into the isocyanate functional components by adding such compounds to the reaction mixture used to prepare the prepolymer. Where the one of more compounds containing one or more active hydrogen containing groups and one or more acrylate groups have only one active hydrogen containing group, the acrylate groups will be located on the end of the polymer chains. The preparation of such compounds is disclosed in commonly owned patent application titled DUAL CURE ADHESIVE USEFUL FOR BONDING TO GLASS, Jialanella US Patent Application 2012/0279654, relevant parts incorporated herein by reference. The free isocyanate content of the prepolymer is selected to provide the desired properties of the composition with respect to cohesive strength, elasticity and adhesive strength. The acrylate content is chosen to provide the desired cure speed as measured by lap shear strength at a specified time and modulus as described hereinbefore. The ratio of free isocyanate content and free acrylate content is chosen to give the desired balance of properties and will be impacted by the presence of other components in the composition such as acrylate containing components, and other active hydrogen containing compounds or isocyanate containing compounds. Preferably the acrylate content is about 1.0 percent by weight or greater based on the weight of the prepolymer, more preferably about 5.0 or greater, even more preferably about 10 percent by weight or greater and most preferably about 15 percent by weight or greater. Preferably the acrylate content is about 60 percent by weight or less based on the weight of the prepolymer, more preferably about 40 percent by weight or less, even more preferably about 30 percent by weight or less and most preferably about 20 percent by weight or less. The one of more compounds containing one or more active hydrogen containing groups and one or more acrylate groups can be any compound, adduct, oligomer or prepolymer containing one of more corn-pounds containing one or more active hydrogen groups and one or more acrylate groups. Preferably such compounds are compounds or adducts and more preferably compounds.

The one or more compounds containing one or more active hydrogen containing groups and one or more acrylate groups can be any compound which contains the recited groups. The active hydrogen groups can be any active hydrogen containing groups as described herein. Preferred active hydrogen groups include amino, hydroxyl and thiol groups, even more preferably amino and hydroxyl groups, with hydroxyl most preferred. Preferably the one of more compounds containing one or more active hydrogen containing groups and one or more acrylate groups correspond to the formula

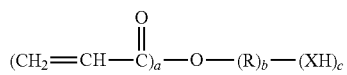

wherein: R is separately in each occurrence a hydrocarbylene group, optionally containing one or more heteroatoms; X is separately in each occurrence $NR^2$, O or S; $R^2$ is separately in each occurrence hydrogen or a hydrocarbyl group, optionally containing one or more heteroatoms; a is separately in each occurrence an integer of from about 1 to 6; b is separately in each occurrence 0 or 1; c is separately in each occurrence an integer of from about 1 to 6. R is preferably $C_{1-30}$ hydrocarbylene optionally containing one or more heteroatoms; more preferably $C_{1-20}$ alkylene, alkenylene, alkynylene, arylene, cycloalkyene, cycloalkenylene, alkarylene, or aralkylene groups or a $C_{4-30}$ polyalkylene polyether, even more preferably $C_{1-20}$ alkarylene, alkylene or cyclo-alkylene or $C_{4-30}$ polylkylene ether and most preferably a $C_{2-6}$ alkylene group, $C_{13-20}$ alkyl bridged biphenylene group or $C_{4-30}$ polyalkylene polyol. $R^2$ is preferably in each occurrence a $C_{1-13}$ alkyl group, $C_{6-12}$ aryl or alkaryl group and most preferably $C_{1-4}$ alkyl or phenyl. X is prefer-ably O or NH and most preferably O. Preferably, a is separately in each occurrence 1 to 4, even more preferably 1 to 2, and most preferably 1. Preferably, c is separately in each occurrence 1 to 4 and most preferably 1 to 2. Exemplary compounds containing one or more active hydrogen containing groups and one or more acrylate groups include, but are not limited to, hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, hydroxybutyl methacrylate, hydroxybutyl acrylate, 3-hydroxypentyl acrylate, 6-hydroxynonyl acrylate, 3-hydroxypropyl methacrylate, 2-hydroxypentyl methacrylate, 5-hydroxypentyl methacrylate, 7-hydroxyheptyl methacrylate, 5-hydroxydecyl methacrylate, N-hydroxymethyl acrylamide. N-hydroxymethyl methacrylamide, diethylene glycol monoacrylate, diethylene glycol monomethacrylate, glycerin dimethacrylate, tri-methylol propane dimeth-acrylate, alkoxylated hydroxyethyl acrylate, trimethylolpropane diacrylate, alkoxylated trimethylolpropane diacrylate, reaction products of polyether glycols of acrylic or methacrylic acid, the monoacrylate or monomethacrylate esters of bisphenol-A, the fully hydrogenated derivative of bisphenol-A, cyclohexyl diol, and the like. More preferably the compounds containing one or more active hydrogen containing groups and one or more acrylate groups include hydroxymethyl(meth)acrylate, 2-hydroxyethyl hydroxyethyl(meth)acrylate, hydroxylpropyl(meth)acrylate, and 2-hydroxy propyl(meth)acrylate. The compounds containing one or more active hydrogen containing groups and one or more acrylate groups are utilized in a sufficient amount to prepare adduct or prepolymers having the desired free acrylate content or when added to the composition separately to achieve the desired acrylate content in the composition as described herein.

Preferably, the polyisocyanates for use in preparing the isocyanate functional components of the invention include any aliphatic, cycloaliphatic, araliphatic, heterocyclic or aromatic polyisocyanates, or mixtures thereof. Preferably, the polyisocyanates used have an average isocyanate functionality of about 2.0 or greater and an equivalent weight of about 80 or greater. Preferably, the isocyanate functionality of the polyisocyanate is 2.2 or greater and is most preferably about 2.4 or greater; and is preferably about 4.0 or less, more preferably about 3.5 or less, and most preferably about 3.0 or less. Higher functionality may also be used, but may cause excessive cross-linking, and result in a composition which is too viscous to handle and apply easily, and can cause the cured composition to be too brittle. Preferably, the equivalent weight of the polyisocyanate is about 110 or greater, is most preferably about 120 or greater; and is preferably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocyclohexyl)methane, and trimethyl hexamethylene diisocyanate. The most preferred isocyanate is diphenylmethane diisocyanate. The amount of isocyanate containing compound used to prepare the prepolymer is that amount that gives the desired properties, that is, the appropriate free isocyanate content and viscosities as discussed herein. Preferably the isocyanate functional prepolymers are the reaction product of one or more polyisocyanates one or more isocyanate reactive compounds wherein an excess of polyisocyanate is present on an equivalents basis. Preferably, the isocyanates are used to prepare the prepolymer in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the prepolymer are used in an amount of about 2.0 equivalents of isocyanate per equivalent of active hydrogen or less, more preferably 1.8 equivalents of isocyanate or less and most preferably about 1.6 equivalents of isocyanate or less.

Preferably the isocyanate functional prepolymers are the reaction product of one or more polyisocyanates with one or more compounds having more than one, preferably two or more, isocyanate-reactive groups wherein an excess of polyisocyanate is present on an equivalents basis. A preferred class of such compounds includes polyols, preferably a mixture of one or more polyether diols and/or one or more polyether triols. The diols and triols are generically referred to as polyols. Preferably, polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each of the alkylene oxides. In one preferred embodiment, the polyol comprises propylene oxide chains with ethylene oxide chains capping the polyol. Preferably the ethylene oxide capped polypropylene oxides are hydrophobic, and preferably contain less than about 20 mole percent of ethylene oxide and more preferably less than 10 mole percent of ethylene oxide in the backbone. In a preferred embodiment, the polyols are a mixture of diols and triols. Preferably, the isocyanate-reactive compound has a functionality of about 1.8 or greater, more preferably about 1.9 or greater, and is most preferably about 1.95 or greater, and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater; and is preferably about 5,000 or less, more preferably about 3.000 or less, and is most preferably about 2,500 or less. The isocyanate reactive components, such as polyols, are present in an amount sufficient to react with most of the isocyanate groups of the isocyanates leaving enough isocyanate groups to correspond with the desired free isocyanate content of the prepolymer. Preferably, the isocyanate reactive components are present in an amount of about 50 parts by weight or greater based on the prepolymer, more preferably about 65 parts by weight or greater and most preferably about 80 parts by weight or greater. Preferably, the isocyanate reactive components are present in an amount of about 90 parts by weight or less based on the prepolymer and most preferably about 85 parts by weight or less. The isocyanate functional prepolymers may contain alkoxy silane moieties. All of the isocyanate functional prepolymers used in the adhesive may contain alkoxysilane moieties or such prepolymers may be blended with one or more isocyanate functional prepolymers which do not contain alkoxy silane moieties. The isocyanate functional prepolymers may contain sufficient alkoxy silane moieties to improve the adhesion to substrates, for instance glass and coated substrates. The alkoxy silane content in the prepolymers is preferably about 0.1 percent by weight or greater, more preferably about 0.4 percent by weight or greater and most preferably about 0.8 percent by weight or greater. The alkoxy silane content in the prepolymers is preferably about 3.0 percent by weight or less, more preferably about 2.0 percent by weight or less and most preferably about 1.0 percent by weight or less. "Alkoxy silane content" means the weight percentage of alkoxy silane moieties to the total weight of the prepolymer.

In one preferred embodiment, the compositions further comprise one or more prepolymers containing one or more organic based polymers dispersed therein or grafted to the backbone. Preferably, the organic based polymer is included in the prepolymer by inclusion of a triol having dispersed therein or grafted to the backbone particles of an organic based polymer. The preferable triols are disclosed in Zhou, U.S. Pat. No. 6,709,539 at column 4, line 13 to column 6, line 18, incorporated herein by reference. Preferably, the triols comprise one or more polyether triols and more preferably one or more polyoxyalkylene based triols. Preferably, such polyoxyalkylene oxide triols comprise polyoxypropylene chains with polyoxyethylene end caps. Preferably, the particles comprise one or more of thermoplastic polymers, rubber-modified thermoplastic polymers or a polyureas. Preferably such prepolymers are contained in the adhesive in an amount of about 5 percent by weight or less and about 0.1 percent by weight or greater.

The prepolymers may be prepared by any suitable method, such as bulk polymerization and solution polymerization. The reaction to prepare the prepolymers is carried out under anhydrous conditions, preferably under an inert atmosphere such as a nitrogen blanket and to prevent crosslinking of the isocyanate groups by atmospheric moisture. The reaction is preferably carried out at a temperature from about 0° C. to about 150° C., more preferably from about 25° C. to about 90° C. until the residual isocyanate content determined by titration of a sample is very close to the desired theoretical value. The reactions to prepare the prepolymer may be carried out in the presence of urethane catalysts. Examples of such catalysts include the stannous salts of carboxylic acids, such as stannous octoate, stannous oleate, stannous acetate, and stannous laurate; dialkyltin dicarboxylates, such as dibutyltin dilaurate and dibutyltin diacetate: tertiary amines and tin mercaptides. The amount of catalyst employed is generally from about 0.005 to about 5 parts by weight of the mixture catalyzed. Preferably, the reaction is carried out in admixture with a plasticizer.

The isocyanate functional components, such as prepolymers, are present in the composition of the invention in a sufficient amount such that the cured composition has sufficient strength for its designed purpose, in the case of adhesive systems such that the adhesive is capable of bonding substrates together and to provide the desired cohesive and adhesive strengths. Preferably, the isocyanate functional components are present in an amount of about 10 percent by weight or greater based on the weight of the composition, more preferably about 30 percent by weight or greater and most preferably about 50 percent by weight or greater. Preferably, the isocyanate functional components are present in an amount of about 70 percent by weight or less based on the weight of the composition, more preferably about 60 percent by weight or less and most preferably about 55 percent by weight or less.

The compositions of the invention comprise one or more compounds containing one or more cycloaliphatic tertiary amines. The one or more compounds containing one or more cycloaliphatic tertiary amines are located in one part and the peroxide containing compound is located in the other part. The one or more compounds containing one or more cycloaliphatic tertiary amines may comprise one or more compounds having one of more cycloaliphatic tertiary amine groups. Exemplary compounds containing one or more cycloaliphatic tertiary amines include dimorpholino dialkyl ethers. Preferred are the dimorpholino dialkyl ethers including dimorpholino diethyl ether and di(dialkylmorpholino) dialkyl ethers such as di(dimethylmorpholino) diethyl ether. The one or more compounds containing one or more cycloaliphatic tertiary amines are present in a composition of the invention in sufficient amount to initiate free radical polymerization when contacted with one or more peroxide group containing compounds and/or catalyze the reaction of isocyanate functional groups with isocyanate reactive groups. The one or more compounds containing one or more cycloaliphatic tertiary amines are present in an amount of about 0.05 percent by weight or greater based on the weight of the composition, more preferably about 0.1 percent by weight or greater and most preferably about 0.5 percent by weight or greater. The one or more compounds containing one or more cycloaliphatic tertiary amine groups are present in an amount of about 20 percent by weight or less based on the weight of the composition, more preferably about 5.0 percent by weight or less and most preferably about 1.0 percent by weight or less.

In one embodiment all of the ingredients except the cycloaliphatic tertiary amine or the peroxide may be located in one part and the cycloaliphatic amine or peroxide is mixed with the other ingredients just before application. Such mixing can be achieved by any means known in the art.

The composition of the invention further comprises one or more compounds containing one or more peroxide groups (—O—O—) which generate free radicals when contacted with the one or more compounds containing one or more cycloaliphatic tertiary amine groups. Any compound which contains one or more peroxide groups which form free radicals when contacted with the one or more compounds containing one or more cycloaliphatic tertiary amine groups can be utilized in this invention. Preferred classes of compounds containing one or more peroxide groups include peroxides, hydroperoxides, perbenzoates, peracids and dialkyl azodialkyronitriles, and the like. Included in preferred classes of such compounds are dialkyl peroxides, diacyl peroxides, hydroperoxides, peresters, and ketone hydroperoxides. Exemplary compounds containing one or more peroxide groups include benzoyl peroxide, cumene hydroperoxide, tertiary butyl hydroperoxide, dicumyl peroxide, di-t-butyl peroxide, 2,5-dimethyl-2,5-di-(tert-butylperoxy) hexyne-3, 2,5-dimethyl-2,5-di-(tert-butylperoxy) hexane, tertiary butyl peroxide acetate, tertiary butyl perbenzoate, ditertiary butyl azodiisobutyronitrile, methyl ethyl ketone hydroperoxide, and the like. The one or more compounds containing one or more peroxide groups are present in sufficient amount to initiate free radical polymerization so as to cure the composition. Preferably the one or more compounds containing one or more peroxide groups are present in an amount of about 0.05 percent by weight or greater based on the weight of the composition, more preferably about 0.1 percent by weight or greater and most preferably about 0.5 percent by weight or greater. Preferably, the one or more compounds containing one or more peroxide groups are present in an amount of about 5.0 percent by weight or less based on the weight of the composition, more preferably about 2.0 percent by weight or less and most preferably about 1.0 percent by weight or less. The one or more compounds containing one or more peroxide groups are preferably located in the composition in the embodiment where an activator is utilized.

The equivalents ratio of the one or more compounds containing one or more peroxide groups to the one or more compounds containing one or more cycloaliphatic tertiary amine groups is chosen such that the composition cures with reasonable speed, for instance to an adhesive which is capable of holding the substrates together under anticipated use conditions, preferably for a significant part or the entire anticipated life of the product. Preferably the equivalents ratio of the one or more compounds containing one or more peroxide groups to the one or more compounds containing one or more cycloaliphatic tertiary amine groups is about 0.1:1.0 or greater and more preferably about 1.0:1.0 or greater. Preferably the equivalents ratio of the one or more compounds containing one or more peroxide groups to the one or more compounds containing one or more cycloaliphatic tertiary amine groups is about 50:1.0 or less and more preferably about 25:1.0 or less. Equivalents ratio means the ratio of reactive groups of the recited compounds, for instance ratio of peroxide to cycloaliphatic tertiary amine groups.

The composition contains one of more low functional acrylate containing components. Low functional acrylate compounds are compounds containing one or more acrylate groups per molecule that may be utilized as resins in a polymerizable composition and preferably contain from about 1 to 4 acrylate groups per molecule. The acrylate containing components comprise any compound (monomer, oligomer or prepolymer) having acrylate groups which react under the conditions of cure recited herein. Among preferred are acrylate containing monomers, oligomers and polymers. Among other specific classes of acrylate containing components are the one or more isocyanate functional prepolymers containing free acrylate groups, one or more adducts of a polyisocyanate and one or more compounds containing one or more acrylate groups and one or more active hydrogen containing groups. In some embodiments the acrylate containing components may comprise any compound (monomer, oligomer or prepolymer) having acrylate groups and no isocyanate groups.

One class of acrylate containing components comprise one or more adducts of one or more polyisocyanates and one or more compounds containing one or more acrylate groups and one or more active hydrogen containing groups. Such adducts contain isocyanate groups and acrylate groups. Both the isocyanate and the acrylate groups participate in the cure of the adhesives of the invention. The isocyanate groups form urea or urethane linkages and the acrylates polymerize via free radical polymerization. The adducts can provide all or a portion of the acrylate groups needed to speed cure and enhance to modulus of the cured product. The adducts are prepared as disclosed in commonly owned patent application titled DUAL CURE ADHESIVE USEFUL FOR BONDING TO GLASS, Jialanella US Patent 2012/0279654, relevant portions incorporated herein by reference The low functional acrylate containing component may comprise acrylate containing monomers, oligomers or prepolymers. The choice of the particular components is based on the ultimate properties desired in the cured adhesive. Any low functional acrylate containing monomers, oligomers or prepolymers which provide the desired properties, cure rate and modulus may be utilized. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, amido and spiro ortho carbonate esters or mixtures thereof. A more preferred class of oligomers and prepolymers are the aliphatic urethane acrylates. Examples of aliphatic urethane acrylate oligomers or prepolymers which are commercially available include those disclosed in commonly owned patent application titled DUAL CURE ADHESIVE USEFUL FOR BONDING TO GLASS, Jialanella US Patent Application 2012/0279654, relevant portions incorporated herein by reference. Most preferred low functional acrylate compounds acrylate and methacrylate compounds such as methylmethacrylate, butyl methacrylate, 2-ethyl-hexylmethacrylate, tetrahydrofurfuryl methacrylate and cyclohexyl methyl methacrylate.

The monomers, oligomers and prepolymers containing acrylate groups and the residue of compounds containing acrylate groups (e.g. remainder of compounds containing active hydrogen containing groups and acrylate groups) are present in the curable compositions of the invention in a sufficient amount to provide the desired free acrylate content of the composition and to impart the desired cure speed and modulus to the cured composition. Preferably the amount of monomers, oligomers and prepolymers containing acrylate groups and the residue of compounds containing acrylate groups is about 1 percent by weight or greater based on the weight of the composition, more preferably about 5 percent by weight or greater, even more preferably about 10 percent by weight or greater, even more preferably about 15 percent by weight or greater, even more preferably about 20 percent by weight or greater, and most prefer-ably about 40 percent by weight or greater. Preferably the amount of monomers, oligomers and prepolymers containing acrylate groups and the residue of compounds containing acrylate groups is about 70 percent by weight or less of the composition of the invention, more preferably about 60 percent by weight or less, even more preferably about 50 percent by weight or less, even more preferably 40 percent by weight or less and most preferably 20 percent by weight or less. The acrylate containing component may be present in either part, and are preferably present in both parts and may be utilized to balance the volumes of the two parts, provided it is not reactive with the other components in the part before contacting the parts.

The compositions of the invention further contain one or more high functional acrylate containing compounds. Such compounds function to speed the cure of the compositions once the two components are contacted. High functional acrylates contain a sufficient amount of acrylate groups per molecule such that the cure rate is accelerated to the level disclosed herein. Preferably the high functional acrylate containing compounds contain, on average 5 or greater acrylate groups per molecule and more preferably on average about 6 acrylate groups per molecule. Preferably the high functional acrylate containing compounds contain, on average about 10 or less acrylate groups per molecule, more preferably on average about 8 acrylate groups per molecule or less and most preferably about 6 acrylate groups per molecule or less. Examples of high functional acrylates include dipentaerythritol pentaacrylate, hexafunctional urethane acrylate, and low viscosity hyperbranched polyester acrylate oligomer and the like. Examples of more preferred high functional acrylates include Dipentaerythritol Pentaacrylate and hexafunctional urethane acrylate. The high functional acrylate containing compounds are present in sufficient amount to speed the cure of the two part composition, preferably such that the cure rates as disclosed herein are achieved. Preferably high functional acrylate containing compounds are pre-sent in an amount of about 0.1 percent by weight of the composition or greater, more preferably about 0.5 percent by weigh or greater and most preferably about 1 percent by weight or greater. Preferably high functional acrylate containing compounds are present in an amount of about 10 percent by weight of the composition or less, more preferably about 8 percent by weight or less and most preferably about 6 percent by weight or less. The high functional acrylates may be located in either or both parts of the composition.

The composition may further contain one or more promoters for free radical polymerization. Any promoter known in the art that promotes free radical polymerization may be used in this invention. A promoter is an organic salt of a transition metal, such as cobalt, nickel, manganese or Iron naphthenate, copper octoate, copper acetylacetonate, iron hexoate, or iron propionate. Promoters are used to enhance cure rate. Promoters, whose effect varies greatly from system to system are used preferably in amounts of about 1 part per million and more preferably about 0.01 weight percent or greater. Promoters are used preferably in amounts of about 2.0 percent by weight or less and most preferably about 0.5 weight percent or less.

The composition may further comprise an adhesion promoter or adhesion promoting component, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. Preferably the adhesion promoter contains a silane present in some form. Preferable methods of including silane functionality in the compositions are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. One or more of the silanes may be blended with the prepolymer. In some embodiments, the silane has one or more active hydrogen atoms which are reactive with an isocyanate. Preferably such silane is a mercapto-silane or an amino-silane and more preferably is a mercapto-trialkoxy-silane or an amino-trialkoxy silane. In some embodiments, the silanes having, active hydrogen atoms reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference In other embodiments, silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). Exemplary organofunctional silanes useful as adhesion promoters or to prepare adducts include amino- or mercapto-alkoxy silanes, isocyanato alkoxy silanes, methacryloxy silanes, epoxy alkoxy silanes, alkenyl alkoxy silanes and the like. Examples of such compounds include: N,N-bis[(3-triethoxysilyl)propyl]amine; N,N-bis[(3-tripropoxy-silyl) propyl]amine; N-(3-trimethoxysiyl) propyl-3-[N-(3-trimethoxysilyl)-propyl amino]propionamide; N-(3-triethoxysilyl)propyl-3-[N-3-triethoxysilyl)-propyl-amino]propionamide; N-(3-trimethoxysilyl)propyl-3-N-3[N-3-triethoxysilyl)-propylamino]propionamide; 3-trimethoxysilylpropyl 3-[N-(3-trimethoxysilyl)-propylamino]-2-methyl propionate; 3-triethoxysilyl propyl 3-[N-(3-triethoxysilyl)-propylamino]-2-methyl propionate; 3-trimethoxysilylpropyl 3-[N-(3-triethoxysilyl)-propylamino]-2-methyl propionate; and the like. Preferably the organo functional silane is gamma-mercaptopropyl-trimethoxysilane (available as A189 from Union Carbide) or N,N'-bis((3-trimethoxysilyl)propyl)amine. The amount of adhesion promoter present is that amount which enhances the adhesion of the adhesive to the substrate surface. The amount of adhesion promoter present is preferably about 0.1 percent by weight or greater based on the weight of the adhesive and most preferably about 0.5 percent by weight or greater. The amount of adhesion promoter used is preferably about 10 percent by weight or less and most preferably about 2.0 percent by weight or less. The adhesion promoter can be located in either or both parts of a two part adhesive, in the one part adhesive and/or in the activator.

The composition may further comprise one or more isocyanate functional pre-polymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. The polyester based isocyanate prepolymer can be prepared using one or more polyester polyols and preferably an aromatic polyisocyanate. In order to facilitate pumpability, it may be diluted with a plasticizer. The amount of polyester polyol in the prepolymer is a sufficient amount to support pumpability of the composition of the invention. Preferably, the polyester polyol based isocyanate prepolymer is present in the composition in sufficient amount to enhance the needed green strength and rheology of the composition. If the amount is too high, the composition is not hand gun applicable at ambient temperature. Preferably, the polyester polyol based isocyanate prepolymer is present in the composition in an amount of about 0 percent by weight or greater based on the weight of the composition, more preferably about 1 percent by weight or greater and most preferably about 2 percent by weight or greater. Preferably, the polyester polyol based isocyanate prepolymer is present in the composition in an amount of about 10 percent by weight or less, even more preferably about 5 percent by weight or less and most preferably about 3 percent by weight or less. The one or more isocyanate functional prepolymers containing one or more polyester based polyols are preferably located in the resin or A side of a two part adhesive.

The composition of the invention also preferably contains one or more plasticizers or solvents to modify rheological properties to a desired consistency. Such materials should be free of water, inert to Isocyanate groups and compatible with the prepolymer. Such material may be added to the reaction mixtures for preparing the isocyanate functional components, such as prepolymers, or to the mixture for preparing the final composition, but is preferably added to the reaction mixtures for preparing the prepolymer and the adduct, so that such mixtures may be more easily mixed and handled. Exemplary plasticizers and solvents are well known in the art and include straight and branched alkylphthalates, such as diisononyl phthalate, dioctyl phthalate and dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired rheological properties and disperse the components in the composition of the invention. Preferably, the plasticizer is present in the compositions of the invention in an amount of about 0 part by weight or greater, more preferably about 5 percent by weight or greater and most preferably about 10 percent by weight or greater. The plasticizer is preferably present in an amount of about 35 percent by weight or less and most preferably about 25 percent by weight or less. The plasticizer may be present in one or both parts of a two part composition. It is preferable that some plasticizer be present in the resin, A part, with the isocyanate functional components, such as prepolymers.

The compositions may further comprise one or more polyfunctional isocyanates for the purpose of improving the modulus of the composition in the cured form. "Polyfunctional" as used in the context of the isocyanates refers to isocyanates having a functionality of 2 or greater. The polyisocyanates can be any monomeric, oligomeric or polymeric isocyanates having a nominal functionality of about 3 or greater and more preferably about 3.2 or greater. Preferably, the polyfunctional isocyanates have a nominal functionality of about 5 or less, even more prefer-ably about 4.5 or less and most preferably about 4.2 or less. The polyfunctional isocyanates can be any isocyanates which are reactive with the isocyanate polyisocyanate prepolymers and/or isocyanate reactive components used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300. DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate is preferably present in an amount of about 0.5 percent by weight or greater based on the weight of the composition, more preferably about 1.0 percent by weight or greater and most preferably about 1.4 percent by weight or greater. The polyfunctional isocyanate is preferably present in an amount of about 8 percent by weight or less, based on the weight of the composition, more preferably about 5 percent by weight or less and most preferably about 3 percent by weight or less. The one or more polyfunctional isocyanates are preferably located in the resin or A side of a two part composition.

The composition may further comprise stabilizers, which function to protect the adhesive composition from moisture, thereby inhibiting advancement and preventing premature crosslinking of the isocyanates in the curable composition. Stabilizers known to the skilled artisan for moisture curing adhesives may be used herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 percent by weight or greater based on the total weight of the curable composition, preferably about 0.5 percent by weight or greater and more preferably about 0.8 percent by weight or greater. Such stabilizers are used in an amount of about 5.0 percent by weight or less based on the weight of the curable composition, more preferably about 2.0 percent by weight or less and most preferably about 1.4 percent by weight or less.

The adhesive composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrrolidones such as 1 methyl-2-pyrrolidone (or N-methyl pyrrolidone). The hydrophilic material is preferably present in an amount of about 0.1 percent by weight or greater based on the weight of the composition and more preferably about 0.3 percent by weight or greater. The hydrophilic material is preferably present in an amount of about 1.0 percent by weight or less and most preferably about 0.6 percent by weight or less.

The composition may further include reinforcing fillers, well-known to those skilled in the art, including carbon black, titanium dioxide, calcium carbonate, surface treated silica, titanium oxide, fumed silica, and talc, with carbon black preferred. In some embodiments, more than one reinforcing filler may be used, of which one is carbon black in a sufficient amount to color to the composition black. Preferably, the only reinforcing filler used is carbon black. The reinforcing fillers are used in a sufficient amount to increase the strength of the composition and to provide thixotropic properties to the composition. Preferably, the reinforcing filler is present in an amount of about 1 percent by weight of the composition or greater, more preferably about 15 percent by weight or greater and most preferably about 20 percent by weight or greater. Preferably, the reinforcing filler is present in an amount of about 40 percent by weight of the composition or less, more preferably about 35 percent by weight or less and most preferably about 33 percent by weight or less. Among optional materials in the composition are clays. Preferred clays useful in the invention include kaolin, surface treated kaolin, calcined kaolin, aluminum silicates and surface treated anhydrous aluminum silicates. The clays can be used in any form which facilitates formulation of a pumpable composition. Preferably, the clay is in the form of pulverized powder, spray dried beads or finely ground particles. Clays may be used in an amount of about 0 percent by weight of the composition or greater, more preferably about 1 percent by weight or greater and even more preferably about 6 percent by weight or greater. Preferably, the clays are used in an amount of about 20 percent by weight or less of the composition and more preferably about 15 percent by weight or less.

The two part compositions may contain a curing agent located in the second part. Such curing agent comprises one of more compounds that contain greater than one hydroxyl group. The curing agents can be one or more hydroxyl containing low molecular weight compounds or polyols. Polyols as described hereinbefore can be utilized as curing agents. One class of polyols can be prepolymers as described hereinbefore prepared utilizing excess equivalents of hydroxyl groups such that the resulting prepolymers contain hydroxyl groups.

The one or more low molecular weight compounds have two or more isocyanate reactive groups and a hydrocarbon backbone wherein the backbone may further comprise one or more heteroatoms. Such low molecular weight compounds may be compounds known in the art as chain extenders, such compounds are difunctional, or crosslinkers, which have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen most preferred. Preferably, the molecular weight of the low molecular weight compound is about 120 or less and more preferably about 100 or less. Preferably, the low molecular weight compound comprises one or more multifunctional alcohols or one or more adducts of multifunctional alcohol and an alkylene oxide or a mixture thereof. Among preferred multifunctional alcohols are ethane diol, propane diol, butane diol, hexane diol, heptane diol, octane diol, glycerine, trimethylol propane, pentaerythritol, neopentyl glycol and the like. Blends of various low molecular weight compounds may be used. The low molecular weight compound is used in a sufficient amount to obtain the desired G-Modulus (E-Modulus). In two-part compositions, the low molecular compound may be located in the resin side, the curative side or both. Preferably, the low molecular weight compound is located in the curative side. Preferably, the low molecular weight compound is present in the composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less.

Other components commonly used in curable compositions may be used in the compositions of this invention. Such materials are well known to those skilled in the art and may include ultraviolet stabilizers and antioxidants and the like. The compositions of the invention may also contain durability stabilizers known in the art, such as alkyl substituted phenols, phosphites, sebacates and cinnamates, as disclosed in commonly owned patent application titled DUAL CURE ADHESIVE USEFUL FOR BONDING TO GLASS, Jialanella US Patent Application 2012/0279654, relevant parts incorporated herein by reference. Preferably, durability stabilizers are present in the composition in an amount of about 0.1 percent by weight or greater and more preferably about 0.2 percent by weight or greater based on the weight of the composition. Preferably durability stabilizers are present in the composition in an amount of about 1.0 percent by weight or less and more preferably about 0.5 percent by weight or less based on the weight of the composition. The composition may further include a light stabilizer which facilitates the system maintaining durable bond to the substrate for a significant portion of the life of the structure to which it is bonded may be used. Preferred light stabilizers are hindered amine light stabilizers. Exemplary hindered amine light stabilizers are disclosed in Hsieh et al. U.S. Pat. No. 7,416,599 column 11, line 31 to line 63, incorporated herein by reference. A sufficient amount of light stabilizer to enhance the bond durability to the substrate. Preferably, the light stabilizer is used in amount of about 0.1 percent by weight or greater based on the weight of the composition, more preferably about 0.2 percent by weight or greater and most preferably about 0.3 percent by weight or. Preferably, the light stabilizer is present in an amount of about 3 weight percent or less based on the weight of the composition, more preferably about 2 weight percent or less and most preferably about 1 weight percent or less. The composition may further comprise an ultra-violet light which enhances the durability of the bond of the composition to a substrate. Preferred UV light absorbers include benzophenones and benzotriazoles. Exemplary UV light absorbers include those disclosed in Hsieh et al. U.S. Pat. No. 7,416,599 column 11, line 64 to Column 12 line 29, incorporated herein by reference. Preferably, the UV absorber is used in an amount of about 0.1 percent by weight or greater based on the weight of the composition, more preferably about 0.2 weight percent or greater and most preferably about 0.3 weight percent or greater. Preferably, the UV light inhibitor is used in amount of about 3 percent by weight or less based on the weight of the composition, more preferably about 2 percent by weight or less and most preferably about 1 percent by weight or less.

Each part of a two part composition may be formulated by blending the components together using means well known in the art. Generally, the components are blended in a suitable mixer. Such blending is preferably conducted in under vacuum or in an inert atmosphere, such as nitrogen or argon, in the absence of oxygen and atmospheric moisture to prevent premature reaction. It may be advantageous to add plasticizers to the reaction mixture for preparing the isocyanate functional prepolymers so that such mixtures may be easily mixed and handled. Alternatively, the plasticizers can be added during blending of all the components. The ingredients are blended for a sufficient time to prepare a well blended mixture, preferably from about 10 to about 60 minutes. Once the composition is formulated, it is packaged in a suitable container such that it is protected from atmospheric moisture. Contact with atmospheric moisture could result in premature crosslinking of the prepolymers containing isocyanate groups. Lack of oxygen with a component with an acrylate component and peroxide compound could result in premature polymerization of the component.

The compositions may used to bond glass to other substrates such as metal or plastics. In a preferred embodiment, the first substrate is a glass or scratch resistant plastic window and the second substrate is a window frame. In another preferred embodiment the first substrate is a window and the second substrate is a window frame of an automobile. Preferably, the window is cleaned and may have a glass wipe or primer applied to the area to which the adhesive is to be bonded. The window flange may be primed with a paint primer. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter, the composition is allowed to cure. The compositions of the invention can be used to bond replacement windows into a structure. In this embodiment, the old window or a portion thereof is removed from the window flange or frame. This is typically achieved by cutting the old adhesive between the glass and the flange or frame. In some circumstances, the portion of the old adhesive remaining on the flange or window frame is left on the frame or flange. The portion of the flange or frame that does not have old adhesive deposited thereon can be primed. The composition of this invention can be applied to the frame or flange over the old adhesive and it will bond to the old adhesive. Generally the old adhesive is a polyurethane, siloxane, siloxy functional polyether or siloxy functional polyolefin.

In use, the components of two-part compositions are blended as would normally be done when working with such materials. For a two-part compositions to be most easily used in commercial and industrial environments, the volume ratio at which the two parts are combined should be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Alternatively the two part composition may be disposed in a single tube with the curative part located in a bag within the resin. In this embodiment a single tube is used and when the two parts are extruded from the tube they are passed through a nozzle containing mixing elements so as to mix the components sufficiently such that the composition can undergo cure once mixed. Some common mix ratios are 1:1, 2:1, 4:1 and 10:1 and can also be odd ratios. Preferably, the two parts are blended at a mix ratio of about 10:1.

Preferably, the mixed two-part compositions of the invention have a suitable viscosity to allow application without dripping. Preferably, the viscosities of the two individual components should be of the same order of magnitude. For lower viscosities, the components may require gelling agent known in the art to prevent sag of the uncured adhesive system. Two-part adhesive compositions start to cure upon mixing the two parts. Curing can be accelerated by applying heat to the curing adhesive by means of infrared heat, induction heat, convection heat, microwave heating, application of ultrasonic vibration and the like.

In another embodiment the compositions of the invention can be used to bond modular components to a car body or to each other. Examples of modular components include vehicle modules, such as door, window or body. Molecular weights as described herein are number average molecular weights determined by Gel Permeation Chromatography.

ILLUSTRATIVE EMBODIMENTS OF THE INVENTION

The following examples are provided to illustrate the invention, but are not intended to limit the scope thereof. All parts and percentages are by weight unless otherwise indicated.

Preparation of Polyether Based Isocyanate Functional Prepolymer with Styrene Acrylonitrile (Prepolymer 1)—A polyether polyurethane prepolymer is prepared by mixing 270 g of a polyoxypropylene having an ethylene oxide end cap and a weight average molecular weight of 2000 with 164 g of a polyoxypropylene triol having a weight average molecular weight of 4500 and 125 g of a styrene acrylonitrile dispersed polyoxypropylene triol with a weight average molecular weight of 3500. Mixing is carried out in a reactor by heating the mixture to 48° C. 87 g of diphenylmethane-4,4'-diisocyanate and 0.5 g stannous octoate are added to the mixture. The whole mixture is then reacted for 1 hour at about 65° C. 323 g of a diisononyl phthalate plasticizer is added to the mixture and the mixing is continued for about 0.5 hour. Thereafter, 6 g of gamma-glycidylpropyl trimethoxysilane and 14 g of a blend of a trisnonylphenyphosphite, 2-(2H-benzotriazole-2-yl)-6-dodecyl-4-methylphenol and bis(2,2,6,6,-pentamethyl-4-piperdinyl) sebacate in equal amounts, about 14 g are added to the mixture. The resulting prepolymer has an isocyanate content of about 1 percent by weight, contains 32 percent of phthalate plasticizer and exhibits a viscosity of about 25,000 to 45,000 centipoise.

Preparation of a Polyether Based Isocyanate Functional Prepolymer (Prepolymer 2) A polyether polyurethane prepolymer is prepared by mixing 203 g of a polyoxypropylene diol having a weight average molecular weight of 2,000 with 294 g of a polyoxypropylene triol having an ethylene oxide cap and weight average molecular weight of 4,500. Mixing is carried out in a reactor by heating the mixture to 48° C. 90 g of dipheylmethane-4,4'-diisocyanate and 0.5 g of stannous octoate are added to the mixture. The whole mixture is then reacted for 1 hour at 65° C. Finally, a sufficient amount of diisononyl phthalate plasticizer is added to the mixture such that the concentration of plasticizer is 33 percent (about 295 g) and the mixing is continued for 1 hour. The resulting prepolymer has an isocyanate content of about 1.5 percent by weight, contains 33 percent of phthalate plasticizer and exhibits a viscosity of about 4.000 to about 9.000 centipoise.

Adhesive A Part Preparation A base A part mixture is prepared from the ingredients listed in Table 1.

TABLE 1

| Ingredient | weight % |
|---|---|
| Prepoymer 1 | 19.1 |
| Prepolymer 2 | 41.5 |
| PAPI ® 20 polymeric MDI; 3.2 functional; 30.4% NCO | 2.1 |
| Elftex ® S7100 carbon black; oil absorption number of 117 cc/100 g | 19 |
| Calcium Carbonate | 12.6 |
| Dimorpholino diethyl ether | 0.6 |
| Bismuth Octoate | 0.28 |
| A-187 epoxy functional silane | 0.26 |
| tetrahydrofurfuryl methacrylate | 4.5 |
| Total | 100 |

The prepolymers and polymeric MDI are charged to a mixer and degassed under vacuum for 15 minutes. The carbon black and calcium carbonate are added and mixed for 5 minutes at slow speed under vacuum until wetted by the prepolymers. The mixing speed is increased and ingredients are mixed for 20 minutes to disperse the carbon black and calcium carbonate. Dimorpholino diethyl ether, bismuth octoate, epoxy functional silane and tetrahydro-furfuryl methacrylate are added and the mixture is mixed for 15 minutes, and removed.

Several A side parts are prepared with 3 percent of each of the high functional acrylates listed in Table 2, which blended with the prepolymer formulation.

TABLE 2

| Example | Acrylate |
|---|---|
| 1 | aliphatic polyester based urethane dimethacrylate oligomer |
| 2 | Tris (2-Hydroxy Ethyl) Isocyanurate Triacrylate |
| 3 | urethane acrylate blended with SR306 (TRIPROPYLENE GLYCOL DIACRYLATE) |
| 4 | Di-Trimethylolpropane Tetraacrylate |
| 5 | Dipentaerythritol Pentaacrylate |
| 6 | hexafunctional urethane acrylate |
| 7 | low viscosity hyperbranched polyester acrylate oligomer |

Preparation of B Side—The B side is prepared by adding the ingredients listed in Table 3 into a double planetary mixer and mixing until a homogeneous mixture is prepared.

TABLE 3

| Ingredient | weight % |
|---|---|
| tetrahydrofurfuryl methacrylate | 55.8 |
| cumene hydroperoxide | 11.2 |
| PARALOID ® BTA-753ER an MBS impact modifier | 26.6 |
| untreated fumed silica | 1.1 |
| Drikalite calcium carbonate | 5.3 |
| Total | 100 |

Adhesive mixing and testing—Weigh 10 grams of the part A into a Ziploc® plastic bag. Add I gram of part B (A:B ratio is 10:1). Quickly twist the bag closed and hand-mix the material for 45 seconds. Twist the bag so the material is compressed tightly in the corner with no air. Use scissors to snip a small hole in the corner of the bag. Quickly squeeze a very small amount of the material on the lower disposable plate of a TA Instruments AR-2000 rheometer. Set the plate gap to 1014 microns. Lock the air bearings on theheometer. Quickly scrape away any excess material from around the disposable plates. Lower the plate gap to 914 microns. Measure the dynamic storage modulus using an oscillating time sweep for a duration 30 minutes, stress of 10 Pa, and a frequency of 1.0 Hz. The results for each adhesive system are illustrated in FIG. 1 where the results are labeled with the relevant example number.

The glass transition temperature for each acrylate example shown in Table 2 is determined from literature values. The Shore A hardness is determined for each system after 15 minutes of cure and after 3 days of cure using the following procedure. Utilize a test specimen that is at least 6 mm thick and has 12 mm in the lateral direction from each edge. The durometer is held in a vertical position with a point of indentation at least 12 mm from an edge. The pressure foot is applied to the specimen as rapidly as possible, without shock, while keeping the foot parallel to the surface of the specimen.

Sufficient pressure is applied to obtain firm contact between the presser foot and specimen. 5 measurements of hardness at different positions on the specimen at least 6 mm apart and the mean is determined. The results are compiled in Table 4. The mean is reported.

TABLE 4

| Example | Functionality | Tg (° C.) | Shore A Hardness @ 15 min. | Shore A Hardness @ 3 days |
|---|---|---|---|---|
| 1 | 2 | 78 | 0 | 73 |
| 2 | 3 | 61 | 0 | 74 |
| 3 | 3 | 57 | minor cure | 74 |
| 4 | 4 | 98 | 0 | 74 |
| 5 | 5 | 90 | 8 | 83 |
| 6 | 6 | 112 | 8 | 80 |
| 7 | 16 | 82 | no cure | 72 |

The results show that the fastest cure occurs when the formulation has an acrylate monomer with a functionality of 5 or 6 as determined according to shore A hardness measurements.

Any numerical values recited in the above application include all values from the lower value to the upper value in increments of one unit provided that there is a separation of at least 2 units between any lower value and any higher value. As an example, if it is stated that the amount of a component or a value of a process variable is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically Intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints The term "consisting essentially of" to describe a combination shall include the elements. Ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition comprising:
    a) one or more isocyanate functional components;
    b) one or more compounds containing a cycloaliphatic tertiary amine;
    c) one or more low functional acrylate containing components having about 1 to 4 acrylate groups per molecule; and,
    d) one or more high functional acrylate containing components having 5 to about 10 acrylate groups per molecule;
    e) one or more compounds containing a peroxide group;
    wherein the composition is a two component composition and components a) and b) are kept separate from component c) until cure is desired.

2. A composition according to claim 1 wherein the one or more high functional acrylate containing components are present in sufficient amount such that the composition reaches at least 50 percent of its final strength within 15 minutes of contacting the components of the two component composition.

3. A composition according to claim 1 wherein the one or more high functional acrylate containing components are present in an amount of about 0.1 to about 5 percent by weight of the total weight of the composition.

4. A composition according to claim 1 wherein the one or more high functional acrylate containing components have 5 to about 8 acrylate groups per molecule.

5. A composition according to claim 1 wherein the one or more high functional acrylate containing components have 5 to about 6 acrylate groups per molecule.

6. A composition according to claim 1 wherein a weight ratio of the one or more compounds containing a peroxide group to the one or more compounds containing a cycloaliphatic tertiary amine is from about 1.0:1.0 to about 200:1.0.

7. A composition according to claim 1 wherein the one or more low functional acrylate containing components comprises one or more of one or more compounds containing one or more acrylate groups, one or more isocyanate functional prepolymers containing free acrylate groups, and one or more adducts of a polyisocyanate and a compound containing one or more acrylate groups and one or more active hydrogen containing groups.

8. A composition according to claim 1 wherein the one or more isocyanate functional components contain from about 0.1 to about 35 percent by weight of free isocyanate groups.

9. A composition according to claim 1 wherein a free acrylate content of the one or more isocyanate functional components is about 1.0 to about 20 percent by weight.

10. A composition according to claim 1 wherein a free acrylate content of the one or more isocyanate functional components is about 0.05 to about 10.0 percent by weight.

11. A method comprising:
    i) contacting the components of the two component composition according to claim 1 together to form a contacted composition;
    ii) contacting the contacted composition of i) with a first substrate;
    iii) contacting the first substrate with a second substrate with the contacted composition of i) disposed between the first substrate and the second substrates; and,
    iv) allowing the contacted composition of i) to cure and bond the first substrate and the second substrate together.

12. A method according to claim 11 wherein the components of the two component composition are mixed before contacting with the first substrate.

13. A method according to claim 11 wherein the first substrate is glass or transparent plastic wherein the glass or transparent plastic has an organic or ceramic enamel frit located about the periphery of the glass or transparent plastic and the second substrate is plastic or metal which is coated.

14. A composition comprising:
    a) one or more isocyanate functional prepolymers further containing about 1 to 4 acrylate groups per molecule;

b) one or more compounds containing as cycloaliphatic tertiary amine;
c) one or more compounds containing a peroxide group; and,
d) one or more high functional acrylate containing components having 5 to about 10 acrylate groups per molecule;

wherein the composition is a two component composition and components a) and b) are kept separate from component c) until cure is desired.

15. A composition according to claim 14 wherein the one or more isocyanate functional prepolymers contain from about 0.1 to about 35 percent by weight of free isocyanate groups and the free acrylate content is about 1.0 to about 20 percent by weight.

16. A composition according to claim 14 wherein the one or more high functional acrylate containing components are present in sufficient amount such that the composition reaches at least 50 percent of its final strength within 15 minutes of contacting the components of the two component composition.

17. A composition according to claim 14 wherein the one or more high functional acrylate containing components are present in an amount of about 0.1 to about 5 percent by weight of the total weight of the composition.

18. A composition according claim 14 wherein the one or more high functional acrylate containing components have 5 to about 8 acrylate groups per molecule.

19. A composition according to claim 14 wherein the one or more high functional acrylate containing components have 5 to about 6 acrylate groups per molecule.

20. A method comprising:
   i) contacting the components of the two component composition according to claim 14 together to form a contacted composition;
   ii) contacting the contacted composition of i) with a first substrate;
   iii) contacting the first substrate with a second substrate with the contacted composition of i) disposed between the first substrate and the second substrates and,
   iv) allowing the contacted composition of i) to cure and bond the first substrate and the second substrate together.

* * * * *